Oct. 15, 1935.  R. E. GILLESPIE  2,017,798
VEHICLE DIRECTION SIGNAL
Filed June 17, 1932  2 Sheets-Sheet 1
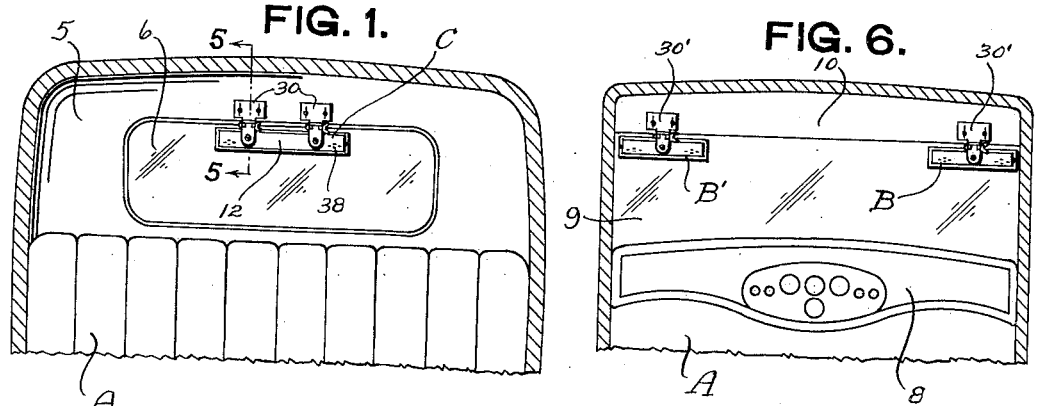
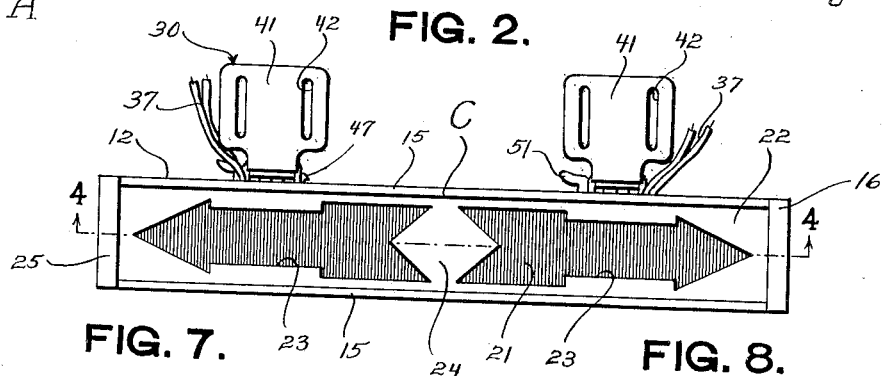
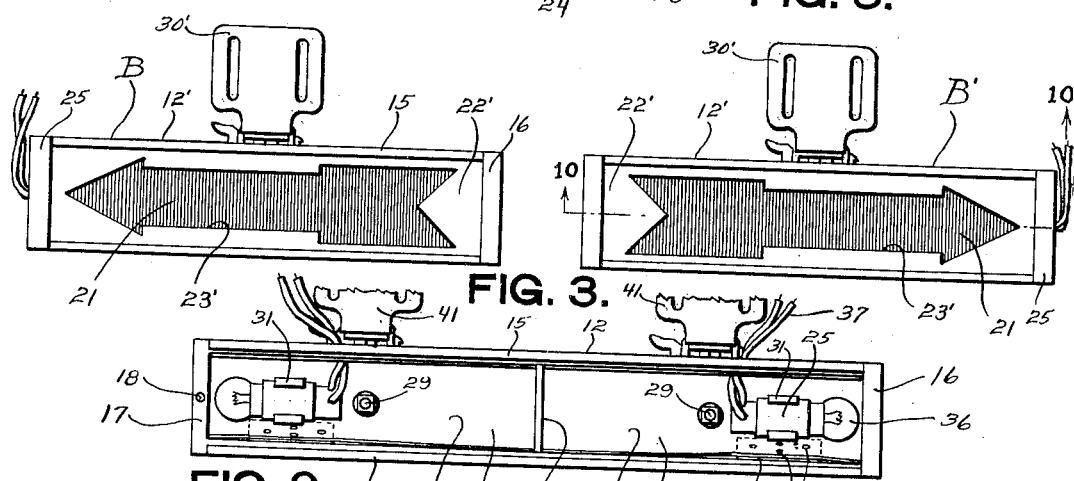
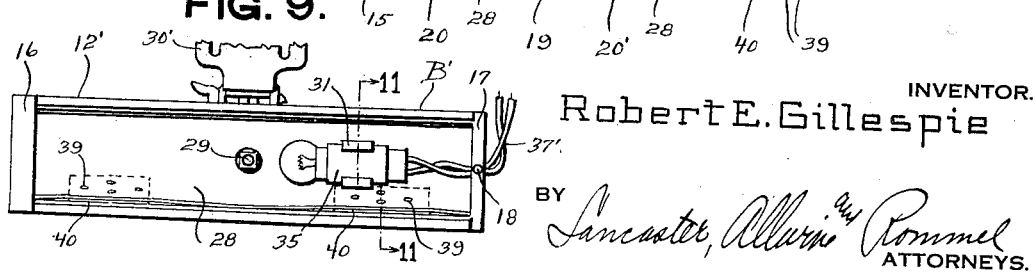
INVENTOR.
Robert E. Gillespie
BY Lancaster, Allwine and Rommel
ATTORNEYS.

Oct. 15, 1935.  R. E. GILLESPIE  2,017,798
VEHICLE DIRECTION SIGNAL
Filed June 17, 1932  2 Sheets-Sheet 2
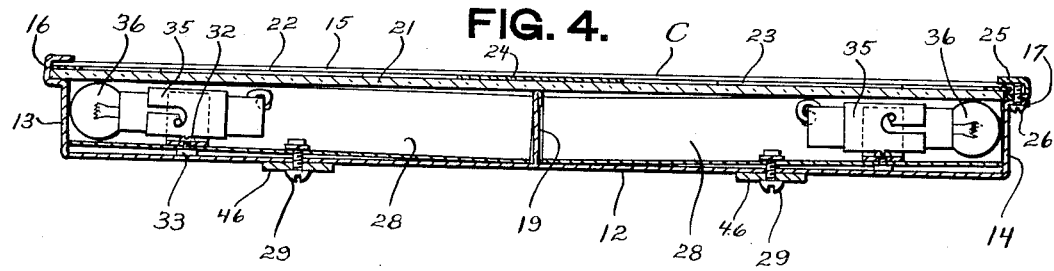
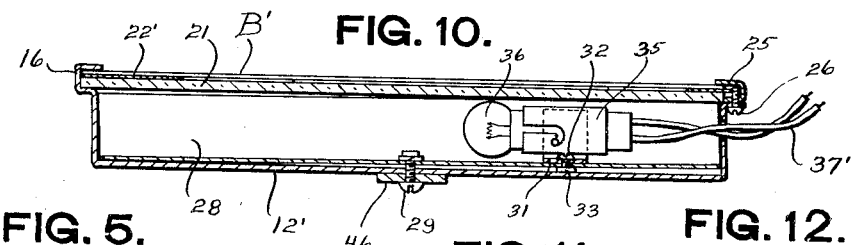
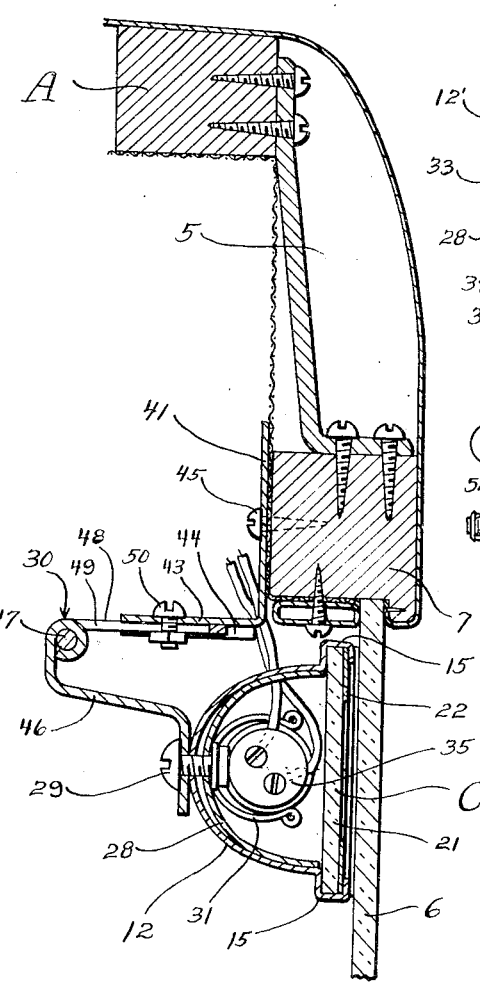
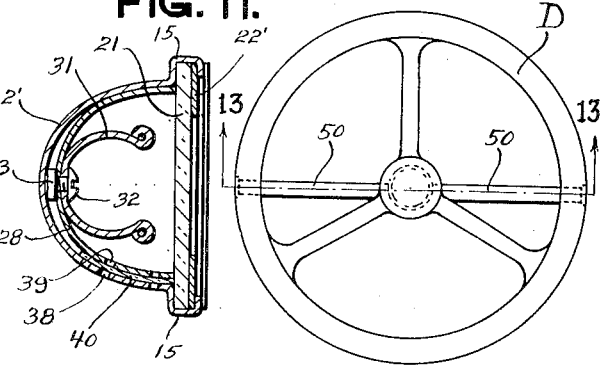
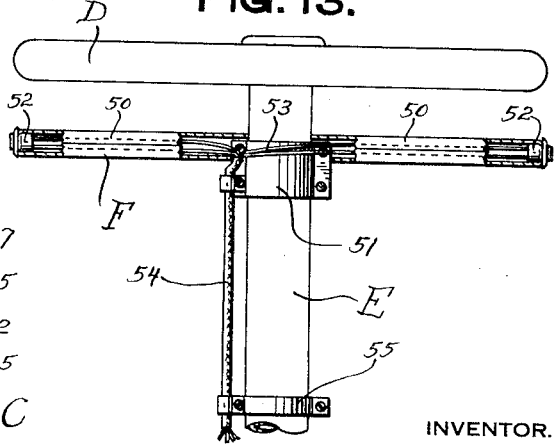
INVENTOR.
Robert E. Gillespie
BY
Lancaster, Allwine & Rommel
ATTORNEYS.

Patented Oct. 15, 1935

2,017,798

UNITED STATES PATENT OFFICE 2,017,798

VEHICLE DIRECTION SIGNAL

Robert E. Gillespie, Springfield, Mo.

Application June 17, 1932, Serial No. 617,892

5 Claims. (Cl. 177—329)

The present invention relates to direction indicating signal means for motor vehicles and the primary object of the invention is to provide an electrically operated direction signalling means for indicating both forwardly and rearwardly of the vehicle, the intended direction in which the vehicle is about to turn.

A further object of the invention is to provide a direction indicator adapted for mounting interiorly of a closed vehicle body for display thru the glass panels of the body.

A further object of the invention is to provide a direction indicator embodying a plurality of indicator units adapted for mounting inside of a vehicle body for giving direction signals both forwardly and rearwardly of the vehicle and adapted to be controlled by a control device disposed in such relation to the steering wheel as to be operated by the driver without removing his hands from the steering wheel.

A further object of the invention is to provide an indicator of this character which will be extremely neat in appearance and which may be mounted upon the interior of a vehicle body without defacing or marring the interior finish of the body.

A further object of the invention is to provide an indicator of this character which is adjustable for positioning against the inner side of the glass panels of a vehicle body and which may be swung out of contact with the glass panels to permit cleaning of the panels and renewal of light bulbs.

A still further object of the invention resides in the novel manner of supporting a light bulb within the indicator casing in a manner to permit ready and easy renewing of the bulb.

A still further object of the invention is to provide signal indicating means of this character wherein the signals are so located as to not become confused with the driving lights of the vehicle.

Other objects and advantages of the invention will be apparent from the following detailed description, taken in connection with the accompanying drawings, forming a part of this specification and in which drawings:—

Figure 1 is a fragmentary transverse section thru a vehicle body looking toward the rear of the body and showing the rear direction indicator applied for displaying signals rearwardly of the vehicle.

Figure 2 is an enlarged plan view of the face side of the rear indicator.

Figure 3 is a view showing the interior of the rear indicator, the signalling panels having been removed from the casing.

Figure 4 is a horizontal section thru the rear indicator on the line 4—4 of Figure 2 and on an enlarged scale.

Figure 5 is an enlarged fragmentary section on the line 5—5 of Figure 1 and showing the manner in which the indicator is adjustably mounted to be swung into and out of contact with the rear window panel.

Figure 6 is a fragmentary transverse section thru a vehicle body looking forwardly and showing the arrangement of mounting the front indicators for display thru the windshield.

Figures 7 and 8 are face plan views of the two front indicators.

Figure 9 is a plan view of one of the front indicators and showing the signalling panels removed.

Figure 10 is an enlarged longitudinal section on the line 10—10 of Figure 8.

Figure 11 is an enlarged transverse section on the line 11—11 in Figure 10.

Figure 12 is a top plan view of a steering wheel showing the circuit controlling device associated therewith.

Figure 13 is a view part in section and part in elevation, substantially on the line 13—13 of Figure 12 and showing the arrangement of mounting the control device upon the steering column.

Referring to the drawings in detail and wherein similar reference characters designate corresponding parts thruout the several views, the letter A may designate a vehicle body of the closed type provided with the interiorly disposed front direction indicating signals B and B' providing right and left turn signals respectively, and a single rear direction indicating signal C providing both right and left rear direction signals. The letter D may designate a steering wheel provided with a steering column E and F designates a signal control device mounted upon the steering column E directly below the steering wheel D for selectively controlling the right and left signals.

The body A is of usual construction and is provided in its rear wall 5 with the usual rear window panel 6 above which is disposed the usual header rail 7. Arranged at the front of the body above the instrument board 8 is the usual windshield 9 above which is disposed the usual windshield header board 10. The header rail 7 provides a mounting for the rear indicator C, while the header board 10 provides a mounting for the front indicators B and B' which are preferably mounted adjacent opposite ends of the board just inwardly of the side walls of the body.

The indicators B, B', and C are of substantially identical construction with the exception that the rear indicator C is of greater length and is sub-divided to provide separate signal compartments adapted for displaying right and left signals.

Referring particularly to Figures 1 to 5 inclusive, the indicator C comprises an elongated semi-cylindrical shaped shell or casing 12 being closed at opposite ends by semi-circular shaped end walls 13 and 14. Formed along each side edge of the casing at the open side thereof is a guide channel 15 and these guide channels extend thruout the length of the casing and as will be observed in Figure 5 are offset outwardly. The end wall 13 is formed along its free edge with a transverse channel 16 which is also outwardly offset from the wall and aligns with the ends of the channels 15. The end casing wall 14 is formed along its free edge with an outturned flange 17 which is apertured midway its ends as at 18 for a purpose to be subsequently described. The casing 12 is provided midway its ends with a semi-circular shaped partition wall 19 dividing the casing into separate signal compartments 20 and 20'.

Slidably guided between the channels 15 over the open side of the casing into engagement at one end in the channel 16, is a lens 21 which is preferably formed of glass and may be colored red or any other preferred color. Slidably guided in the channels 15 at the outer or face side of the lens 21 is a sheet metal cover plate 22 which also abuts at one end in the channel 16. This metal cover plate 22 is cut out to form a pair of oppositely extending arrows as indicated at 23 divided by a center section 24 which is disposed over the dividing partition 19. Thus, a display arrow is formed for each of the signal compartments 20 and 20'.

The lens 21 and cover plate 22 are retained in position over the open side of the casing by means of a channel-shaped retainer 25 having a threaded opening in its inner or rear flange for receiving a retaining screw 26 passed thru the aperture 18 in the flange 17 of the casing. The retainer 25 aside from preventing displacement of the lens and cover plate also provides a finishing strip for one end of the casing to correspond with the channel 16.

Arranged within each of the signal compartments 20 and 20' is a semi-cylindrical shaped reflector 28 and these reflectors are held in position by means of mounting bolts 29 passed thru aligning apertures formed thru the crown portions of the reflectors and the casing 12. These mounting bolts 29 also provide means for attachment of adjustable mountings 30 adapted for mounting the indicator inwardly of the rear window panel 6.

Mounted in each signal compartment 20 and 20', and carried one by each of the reflectors 28 is a U-shaped spring clip 31 and these clips are mounted with their axes parallel to the axis of the semi-cylindrical shaped casing 12. These socket receiving spring clips 31 are secured in position by means of a machine screw 32 passed thru aligning apertures in the base portion of the clip and crown portion of the reflectors and threaded into a preferably square nut 33 which is disposed between the reflectors and the casing 12. The curvature of the casing 12 serves to hold the nut 33 against rotation and thus the spring clips are held against loosening. From Figure 4 it will be noted that the mounting bolts 29 serve to clamp the nuts 33 between the reflectors and the casing.

Snapped into position in each of the spring clips 31 is a socket 35 preferably of the bayonet slot type and each of which is adapted to receive an electric bulb 36 for illuminating the signal compartments. The lead wires 37 for connection to the socket 35 may be extended into the signal compartments thru suitable openings formed thru the casing and reflectors adjacent the mountings 30. The lamps 36 are selectively illuminated by means of the control means F.

The casing 12 is provided adjacent each end with tell tale sight apertures 38 which align with apertures 39 provided in each of the reflectors 28, and a transparent sheet such as of celluloid or the like 40 is disposed between the casing and reflectors at the apertures to prevent entrance of dust into the casing. These aligning apertures 38 and 39 are formed relatively small and provide means whereby the operator may readily observe as to whether the lamps are being illuminated. The transparent sheet 40 will be clamped in position by the mounting bolts 29. These aligning sight apertures 38 and 39, together with the dust excluding transparent sheet 40 are shown more clearly in Figure 11.

The adjustable mountings 30 for the casing 12 comprise an angle-shaped bracket providing a mounting plate 41 provided with elongated slots 42, and a supporting plate 43 provided with downturned side flanges 44. The mounting plates 41 are adapted to be secured to the header rail 7 by screws 45, and the slots 42 will permit vertical adjustment of the mounting bracket. Connecting the mounting bracket and the indicator casing are hinge members having one leaf 46 secured by the mounting bolts 29 to the casing. The leaves 46 are hinged as at 47 to leaves 48 which are longitudinally slotted as at 49 and are adapted to extend below the supporting plate 43 with its side edges engaging the flanges 44. An adjusting bolt 50 extended thru the slots 49 serves to permit adjustment of the indicator toward and from the window panel 6. The hinge pin 47 may be provided with a wing nut 51 whereby the indicator may be held in its adjusted position against swinging movement. This manner of mounting the indicator permits adjustment of the indicator into engagement with the window panel so that the signal indications will be displayed thru the upper portion of the window panel and allows for the indicator to be swung out of operative position for cleaning purposes and renewing of bulbs when such becomes necessary. It may here be well to mention that the manner of mounting the socket 35 in the spring clips 31 permits ready removal of the socket so that the bulb 36 may be easily removed from and placed in the socket.

The indicator C is preferably mounted centrally of the upper portion of the rear window panel 6 and owing to the formation of the indicator, rear vision of the driver will not be obstructed to any material extent. From Figure 5 it will be noted that the adjustable mountings 30 permit mounting of the indicator upon various types of rear window constructions and without marring or defacing the interior finish of the vehicle body.

In Figures 6 to 11 inclusive, like reference characters have been applied to parts corresponding to parts shown in Figures 1 to 5 inclusive and additional reference characters have been applied to parts differing other than in mere size.

In the front signal indicators B and B', the sheet metal cover plates 22' are formed with but a single arrow 23' and when mounted by the adjustable mountings 30' have the arrows pointing in opposite directions. The lead wires 37' are extended thru the end walls of the semi-cylindrical shaped casings 12' which are formed shorter than the rear indicator casing 12.

The front indicators B and B' are mounted upon the windshield header board 10 so that the arrows will be displayed thru the windshield 9.

Referring now to the means F for controlling the indicators, the same comprises a pair of hollow supporting arms 50 secured in axial alignment diametrically of the steering wheel D and upon the steering column E as by a suitable clamp 51. The arms 50 are arranged slightly below the steering wheel and mounted in the outer end of each arm is a push button 52 suitably connected to electric wires 53 which in turn are connected in an electric circuit in which the signal lamps 36 are connected. The wires 53 may extend into a cable 54 suitably secured to the steering column as at 55. The circuit arrangement is such that when the right control button is pressed, both the front and rear right direction signals will be given, and when the left control button is pressed, both front and rear left direction signals will be given.

Thus it will be seen that a novel and improved vehicle direction signalling arrangement is provided wherein a plurality of direction signals mounted interiorly of the vehicle body are arranged to have the signals displayed thru front and rear transparent window panels. It will also be apparent that an arrangement is provided whereby the indicators are arranged in such remote relation to the running lights of the vehicle as to not become confused therewith when the signals are displayed. It will further be apparent that a signal of novel construction has been provided which will be extremely neat in appearance and readily adaptable for mounting in various types of vehicle body constructions.

Changes in detail may be made to the form of invention herein shown and described, without departing from the spirit of the invention or the scope of the following claims.

I claim:

1. In a vehicle direction signal, an elongated semi-cylindrical shaped reflector, a U-shaped clip having a crown portion of substantial width and mounted in the reflector with the crown portion of the clip inwardly tangent to the reflector, a fastening element extended through the reflector and the crown portion of the clip for securing the clip in fixed longitudinal alignment with the reflector and a cylindrical lamp receiving socket supported in the clip longitudinally of the reflector.

2. In a vehicle direction signal, an elongated semi-cylindrical shaped casing having an open side, a signal display lens for the open side of the casing, a semi-cylindrical shaped reflector arranged concentrically in the casing, a U-shaped spring clip having a surface inwardly tangent to the reflector, a fastening element extended through the clip and reflector at a point along their line of tangency whereby the clip is non-rotatably secured to the reflector with their longitudinal axes in parallel relation and a lamp receiving socket releasably held in the clip longitudinally of the casing.

3. In a vehicle direction signal, a semi-cylindrical shaped casing having an open side, a signal display lens closing the open side of the casing, a semi-cylindrical shaped reflector concentric in the casing, a mounting bolt securing the reflector in the casing, a spring clip inwardly tangent to the reflector, a retaining screw extended through the clip and reflector, a nut for said screw and clamped between the reflector and casing by said mounting bolt, and a lamp receiving socket releasably held in the clip.

4. In a vehicle direction signal, an elongated shallow semi-cylindrical casing, a signal display panel mounted in the casing, an elongated shallow semi-cylindrical reflector nested in the casing, a U-shaped lamp-socket-receiving spring clip of smaller radius than that of the semi-cylindrical reflector, said clip being secured to the reflector internally tangent thereto, and a lamp socket releasably held by the clip, said socket being disposed wholly within and longitudinally of the casing.

5. In a vehicle direction signal, a semi-cylindrical shaped casing closed at its ends and having an open longitudinal flat side, a semi-cylindrical shaped reflector arranged concentrically in the casing, said casing and reflector having aligning light apertures, a transparent sheet placed between the reflector and casing at the aligning apertures, means securing the reflector in the casing and clamping the transparent sheet in place between the reflector and casing, illuminating means in the casing and a signalling panel closing the open side of the casing.

ROBERT E. GILLESPIE.